United States Patent
Suga et al.

(10) Patent No.: US 7,168,728 B2
(45) Date of Patent: Jan. 30, 2007

(54) STROLLER FOLDABLE IN THREE

(75) Inventors: Nobuhide Suga, Saitama (JP); Yuichi Arai, Saitama (JP); Toshiharu Hatano, Iwatsuki (JP)

(73) Assignee: Combi Corporation, Tokyo-To (JP)

( * ) Notice: Subject to any disclaimer, the term of this patent is extended or adjusted under 35 U.S.C. 154(b) by 0 days.

(21) Appl. No.: 11/035,957

(22) Filed: Jan. 18, 2005

(65) Prior Publication Data

US 2005/0121882 A1    Jun. 9, 2005

Related U.S. Application Data

(62) Division of application No. 10/214,488, filed on Aug. 8, 2002, now Pat. No. 6,860,504.

(30) Foreign Application Priority Data

Aug. 9, 2001    (JP) .............................. 2001-242354

(51) Int. Cl.
B62B 7/06    (2006.01)
(52) U.S. Cl. ................. 280/642; 280/47.38; 280/47.4; 280/644; 280/650
(58) Field of Classification Search ................ 280/642, 280/647–650, 644, 658, 47.4, 41.371, 47.38, 280/47.25, 657; 297/42, 44, 45; 403/100, 403/101, 102, 103
See application file for complete search history.

(56) References Cited

U.S. PATENT DOCUMENTS

| | | | |
|---|---|---|---|
| 2,437,778 A * | 3/1948 | Ames ............................ 297/6 |
| 4,191,397 A | 3/1980 | Kassai |
| 4,506,907 A * | 3/1985 | Miyagi ....................... 280/642 |
| 4,545,599 A | 10/1985 | Kassai |
| 4,565,388 A * | 1/1986 | Kassai ........................ 280/644 |
| 4,614,454 A * | 9/1986 | Kassai ......................... 403/62 |
| 4,619,542 A * | 10/1986 | Kassai ......................... 403/62 |
| 4,765,645 A * | 8/1988 | Shamie ....................... 280/644 |
| 5,181,735 A * | 1/1993 | Onishi ........................ 280/642 |
| 5,205,579 A * | 4/1993 | Kato et al. .................. 280/642 |
| 5,535,483 A * | 7/1996 | Jane Cabagnero ........... 16/429 |
| 5,664,798 A * | 9/1997 | Huang ........................ 280/642 |
| 5,669,623 A | 9/1997 | Onishi |
| 5,752,738 A | 5/1998 | Onishi et al. |
| 5,810,382 A * | 9/1998 | Onishi ........................ 280/658 |
| 5,871,227 A | 2/1999 | Huang |
| 6,068,284 A * | 5/2000 | Kakuda ....................... 280/642 |

(Continued)

FOREIGN PATENT DOCUMENTS

DE    295 09 125    8/1995

(Continued)

Primary Examiner—Christopher P. Ellis
Assistant Examiner—Vaughn Coolman
(74) Attorney, Agent, or Firm—Wenderoth, Lind & Ponack, L.L.P.

(57) ABSTRACT

A stroller is provided with a handle having a horizontal middle part and two side pipes. The two side pipes are connected to the horizontal middle part by gear trains so as to be turnable about axes perpendicular to an axis of the horizontal middle part, respectively. A folding part operating mechanism is incorporated into the horizontal middle part of the handle. The side pipes can be folded and unfolded relative to the horizontal middle part by turning the horizontal middle part about its axis.

4 Claims, 18 Drawing Sheets

U.S. PATENT DOCUMENTS

| | | |
|---|---|---|
| 6,129,373 A | 10/2000 | Cheng |
| 6,339,862 B1 * | 1/2002 | Cheng .................... 16/113.1 |
| 6,422,587 B1 * | 7/2002 | Yamazaki et al. ......... 280/647 |
| 6,428,034 B1 * | 8/2002 | Bost .......................... 280/650 |
| 6,431,579 B1 | 8/2002 | Kaneko et al. |
| 6,443,479 B2 | 9/2002 | Huang |
| 6,824,161 B2 * | 11/2004 | Iwata ....................... 280/642 |

FOREIGN PATENT DOCUMENTS

| | | |
|---|---|---|
| EP | 0 494 736 | 7/1992 |
| EP | 0 719 693 | 7/1996 |
| EP | 0 732 251 | 9/1996 |
| EP | 1 092 608 | 4/2001 |

* cited by examiner

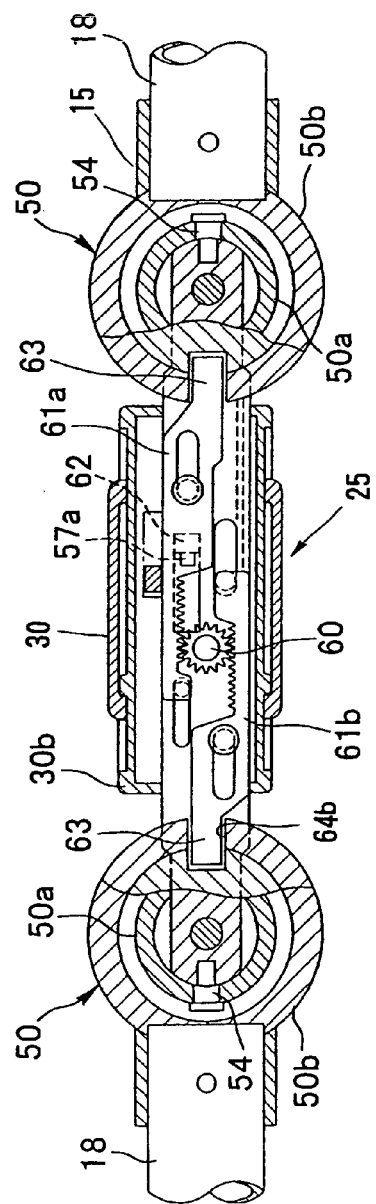
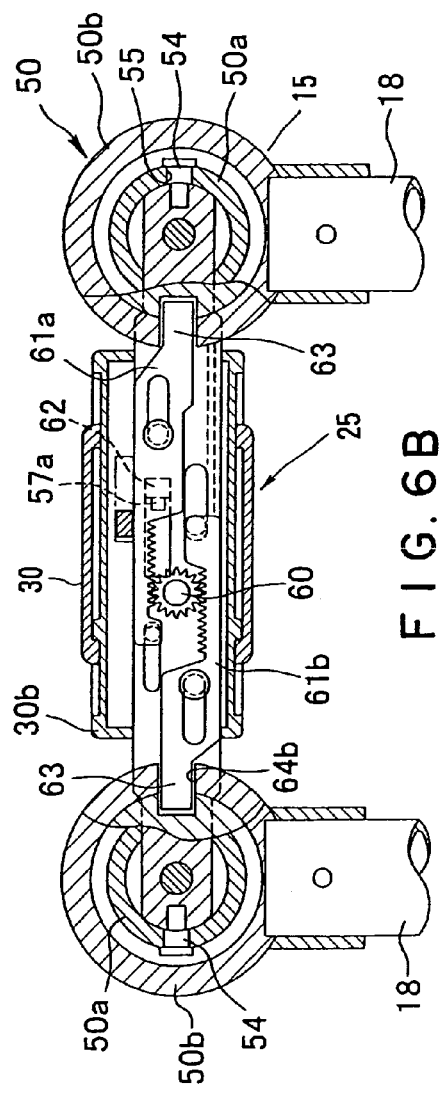
FIG. 6A
FIG. 6B

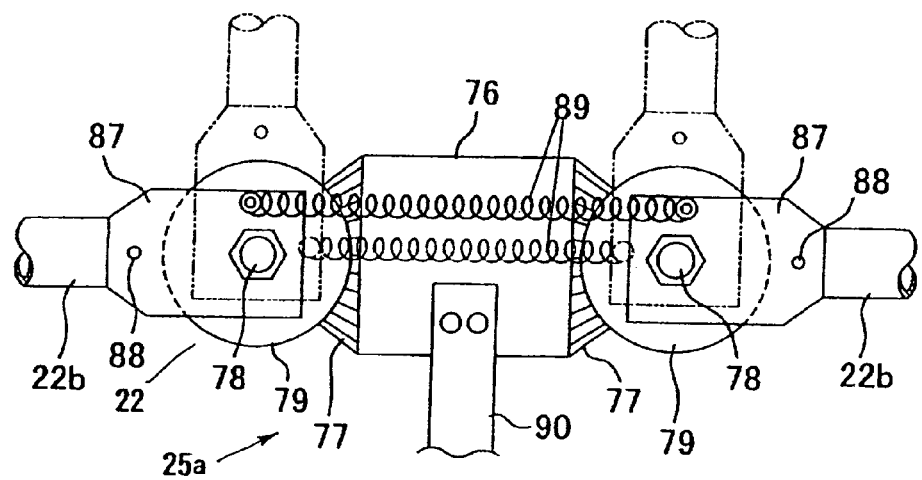
F I G. 12
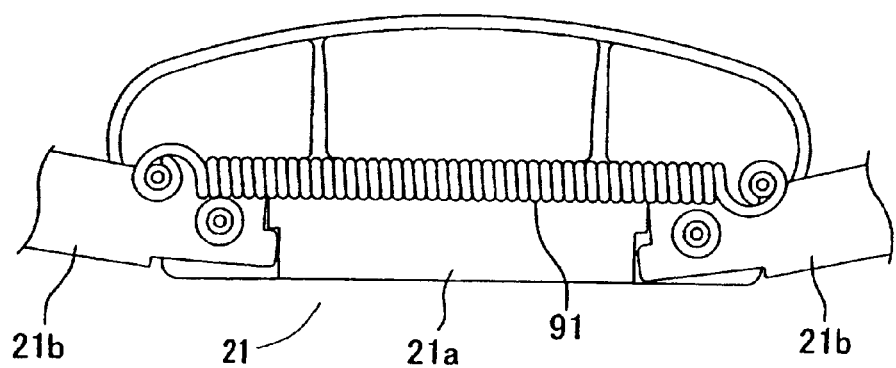
F I G. 13

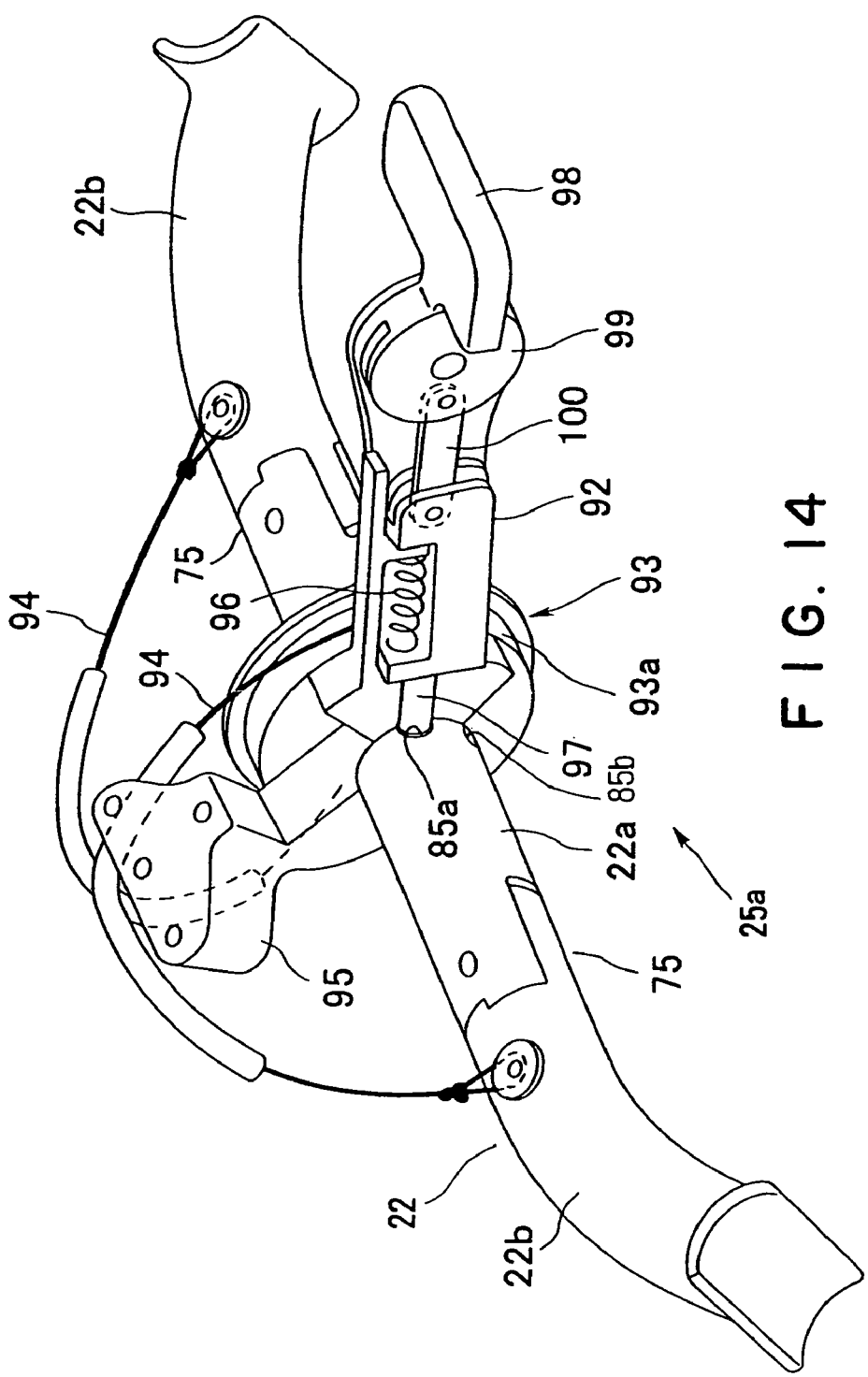
F I G. 14

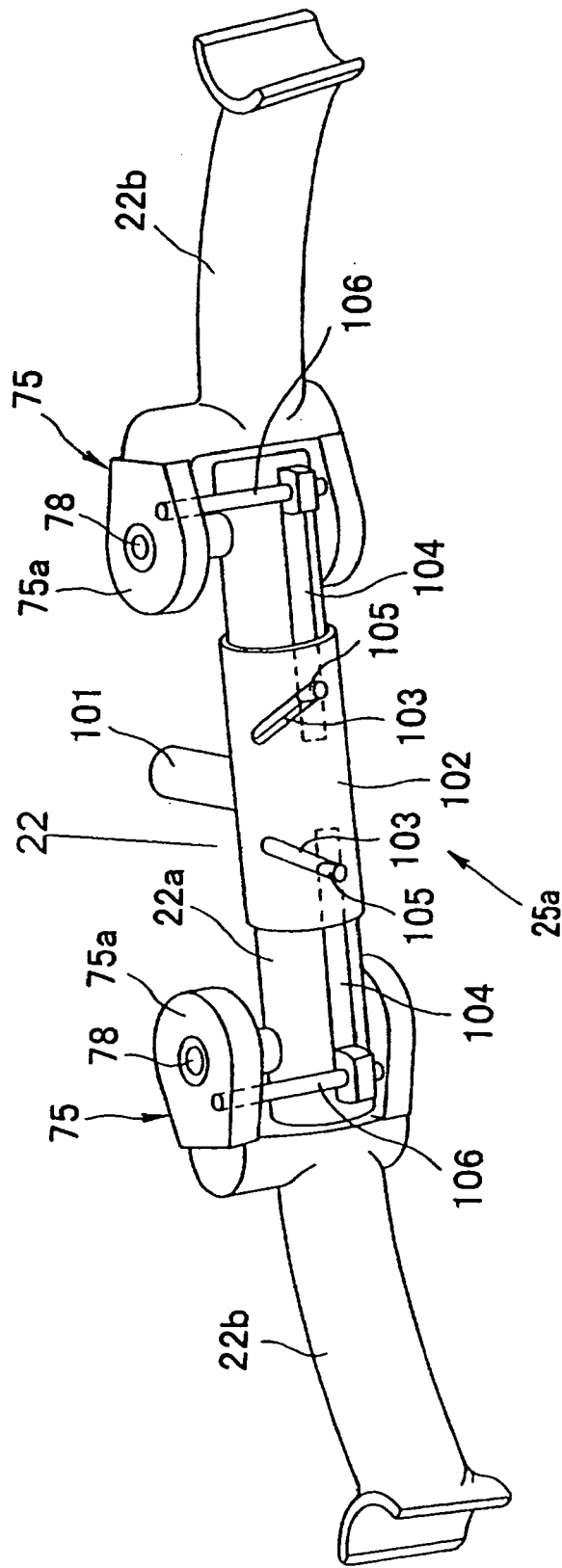
F I G. 16

STROLLER FOLDABLE IN THREE

This application is a divisional of U.S. patent application Ser. No. 10/214,488, filed Aug. 8, 2002 now U.S. Pat. No. 6,860,504.

BACKGROUND OF THE INVENTION

1. Field of the Invention

The present invention relates to a stroller foldable in three provided with a folding part operating mechanism.

2. Description of the Related Art

There have been proposed various folding strollers for carrying a baby outdoors for walking or shopping, capable of being folded to facilitate storing and carrying.

When a user folds a folding stroller compactly, the user needs to hold opposite end parts of a handle or armrests by hand and to fold the stroller after flattening a seat unit, or needs to hold a middle part of the handle and to tilt the stroller such that side parts of the stroller are folded by gravity.

Therefore, the user needs to take his/her hands off the handle and to grip opposite end parts of the handle or the armrests, and the user needs to use both hands for folding the stroller, which is difficult to do while holding a baby. When gravity is used for folding a stroller, the stroller needs to be provided with many joints to reduce resistance against a folding movement of parts of the stroller. These joints reduce rigidity of a main structure of the stroller, lessen a sensation of operation and make it difficult for a user to feel a sensation of locking.

SUMMARY OF THE INVENTION

The present invention has been made in view of the foregoing problems and it is therefore an object of the present invention to provide a stroller foldable in three comprising: a handle having a horizontal middle part, and two side pipes connected to opposite ends of the horizontal middle part so as to be turnable about axes perpendicular to an axis of the horizontal middle part, respectively; and a folding part operating mechanism incorporated into the handle, wherein the folding part operating mechanism turns the two side pipes relative to the horizontal middle part.

In the folding stroller foldable in three according to the present invention, the horizontal middle part is capable of turning about its axis, the folding part operating mechanism has gear trains interposed between the horizontal middle part and the two side pipes, respectively, which interlock the horizontal middle part and the side pipes.

In the folding stroller foldable in three according to the present invention, each of the gear trains includes a first bevel gear mounted on the horizontal middle part, and a second bevel gear mounted on a corresponding side pipe.

The folding stroller foldable in three according to the present invention is provided with locking members for maintaining the stroller in an unfolded state, and a release mechanism for releasing the locking members, incorporated into the horizontal middle part.

In the stroller foldable in three according to the present invention, the release mechanism includes sliding members with projections disposed for sliding in the horizontal middle part and connected to the locking members by wires, a cam member provided with slots respectively engaged with the projections of the sliding members and capable of being moved in opposite directions perpendicular to the axis of the horizontal middle part, and a release lever for operating the cam member for movement in the opposite directions. The slots are inclined relative to the axis of the horizontal middle part, and the sliding members can be made to slide in the horizontal middle part by moving the cam member in the opposite directions perpendicular to the axis of the horizontal middle part by operating the release lever to release the locking members.

In the stroller foldable in three according to the present invention, the cam member has an inclined wall declining toward the release lever, and an end part of the release lever is pressed against the inclined wall of the cam member to move the cam member in a direction perpendicular to the axis of the horizontal middle part.

In the stroller foldable in three according to the present invention, the folding part operating mechanism has tubular structures interposed between the side pipes and the horizontal middle part, extending along turning axes of the side pipes, and provided with helical guide grooves formed in their inner surfaces, respectively, the horizontal middle part is capable of sliding relative to the tubular structures along the axes of the tubular structures, the horizontal middle part is provided with projections respectively engaged in the helical guide grooves of the tubular structures, and the projections of the horizontal middle part are to slide along the helical guide grooves of the tubular structures by sliding the horizontal middle part relative to the tubular structures to turn the side pipes together with the corresponding tubular structures relative to the horizontal middle part.

In the stroller foldable in three according to the present invention, each of the tubular structures consists of coaxial inner and outer tubes capable of turning relative to each other, openings for passing the horizontal middle part are formed in the inner and outer tubes, respectively, the helical guide groove is formed in the inner tube, and the inner tube and the outer tube are connected by a coil spring.

In the stroller foldable in three according to the present invention, retractable bolts are supported on the opposite end parts of the horizontal middle part, first recesses into which the retractable bolts engage when the handle is unfolded to hold the handle in an unfolded state are formed in upper ends of openings formed in the tubular structures, respectively, and second recesses into which the retractable bolts engage when the handle is folded to hold the handle in a folded state are formed in lower ends of the openings formed in the tubular structures, respectively.

The stroller foldable in three according to the present invention further includes locking members for maintaining the stroller in an unfolded state, and a release mechanism for releasing the locking members, incorporated into the horizontal middle part, and is further provided with a release lever interlocked with retractable bolts.

In the stroller foldable in three according to the present invention, the horizontal middle part is turnable about its axis, the folding part operating mechanism includes two gears supported for turning in the horizontal middle part, an operating lever for turning the two gears, and shape memory springs, wherein each of the shape memory springs has one end connected to a corresponding gear and another end lying in and fastened to a corresponding side pipe.

A stroller foldable in three according to the present invention includes right and left rear legs, and a rear connecting bar connecting the rear legs, wherein the rear connecting bar has a middle section, and two end sections pivotally connected to opposite ends of the middle section, respectively, a foot-operated folding part operating mechanism is mounted on the rear connecting bar, and the two end sections are turned relative to the middle section by operating the folding part operating mechanism.

In the stroller foldable in three according to the present invention, the foot-operated folding part operating mechanism is combined with the middle section and the two end sections of the rear connecting bar.

In the stroller foldable in three according to the present invention, the foot-operated folding part operating mechanism includes a tubular member provided on the middle section and holding first bevel gears on its opposite ends, and second bevel gears respectively connected to the two end sections; and the second bevel gears are engaged with the first bevel gears.

In the stroller foldable in three according to the present invention, an operating lever projects outwardly from the tubular member, and a locking bolt for locking the tubular member relative to the middle section of the rear connecting bar is placed slidably in the operating lever.

In the stroller foldable in three according to the present invention, the operating lever is pivotally supported on the tubular member for forward and backward turning through a predetermined angle, a locking bolt provided with a guide pin at its outer end is placed movably in the operating lever, and V-shaped guide grooves diverging toward a free end of the operating lever are formed in an inner surface of the operating lever.

In the stroller foldable in three according to the present invention, an unlocking member is pivotally connected to an outer end part of the operating lever, and the unlocking member is connected to the locking bolt by a link.

In the stroller foldable in three according to the present invention, the second bevel gears are connected to corresponding end sections of the rear connecting bar by coil springs having axes aligned with turning axes of the end sections of the rear connecting bar, respectively.

In the stroller foldable in three according to the present invention, plates are attached to the second bevel gears, respectively, and a spring is extended between the plates so as to urge the plates together with the end sections of the rear connecting bar in a folding direction.

The stroller foldable in three according to the present invention is provided with right and left front legs, and a front connecting bar connecting the front legs, wherein the front connecting bar has a middle section and two end sections pivotally connected to opposite ends of the middle section, respectively, and a spring is extended between the two end sections of the front connecting bar so as to urge the end sections in a folding direction.

In the stroller foldable in three according to the present invention, a pulley provided with an operating lever is mounted for turning on the middle section of the rear connecting bar, first ends of two wires are fixed to the pulley, and second ends of the wires are guided by guide members and connected to the end sections of the rear connecting bar, respectively.

In the stroller foldable in three according to the present invention, a tubular member provided with laterally symmetrical, inclined slots is mounted on the middle section of the rear connecting bar, two connecting rods are supported so as to move along the middle section of the rear connecting bar, first ends of the connecting rods are connected to the end sections of the rear connecting bar, respectively, and projections connected to second ends of the connecting rods are engaged in the inclined slots of the tubular member, respectively.

In the stroller foldable in three according to the present invention, an operating rod is formed integrally with one of the end sections of the rear connecting bar so as to extend from the same, and a middle part of the operating rod is connected to a middle part of the other end section by a link.

BRIEF DESCRIPTION OF THE DRAWINGS

FIGS. 6A and 6B are sectional views of assistance in explaining operation of the second embodiment;

FIG. 12 is a bottom view of the fifth embodiment shown in FIG. 11;

FIG. 13 is a view of a front connecting bar provided with a folding spring;

FIG. 14 is a perspective view of a sixth embodiment according to the present invention;

FIG. 16 is a perspective view of a seventh embodiment according to the present invention;

DETAILED DESCRIPTION OF THE PREFERRED EMBODIMENTS

Preferred embodiments of the present invention will be described with reference to the accompanying drawings.

Figure 1:
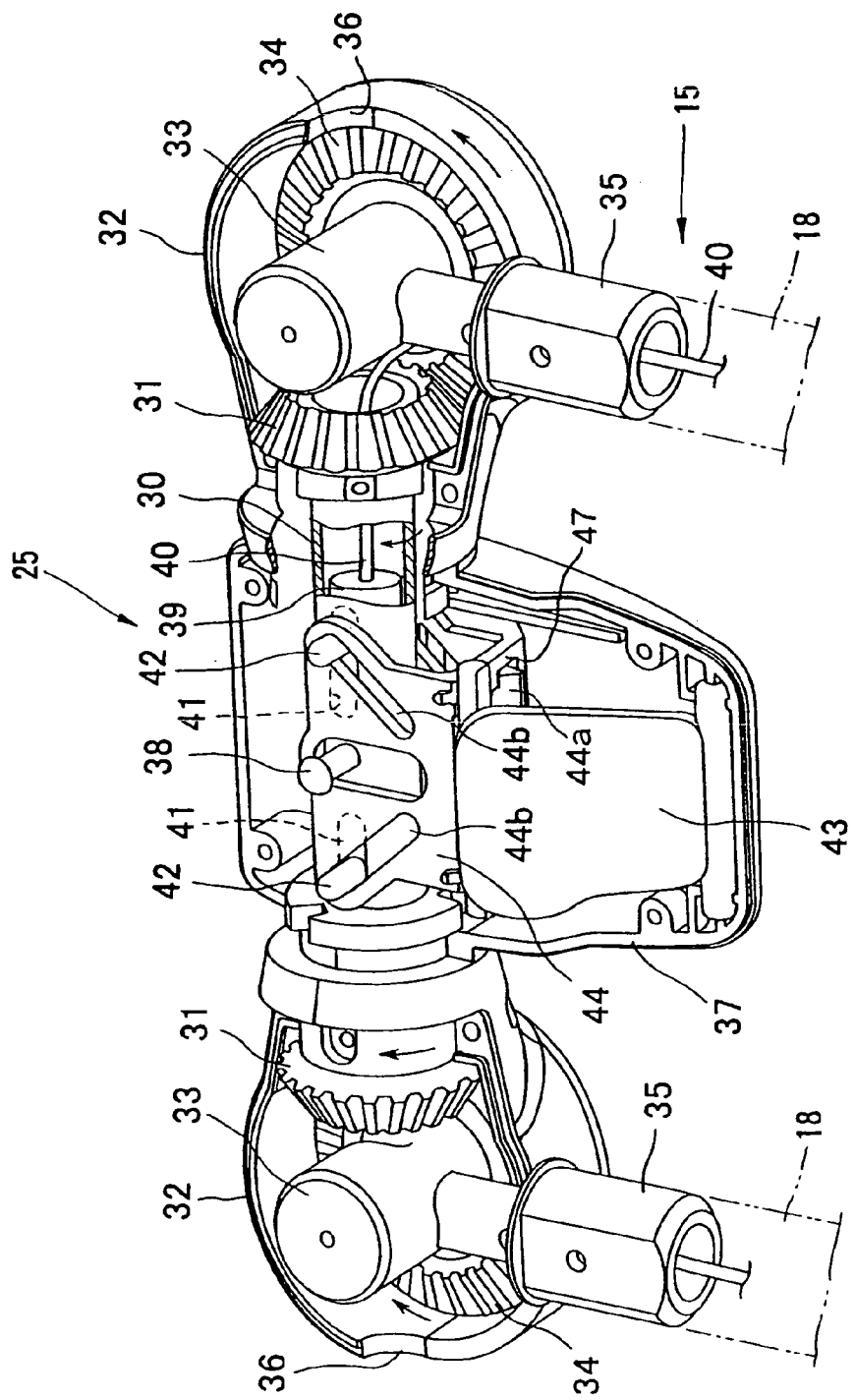
FIG. 1 is a sectional perspective view of a first embodiment according to the present invention.
Figure 19:
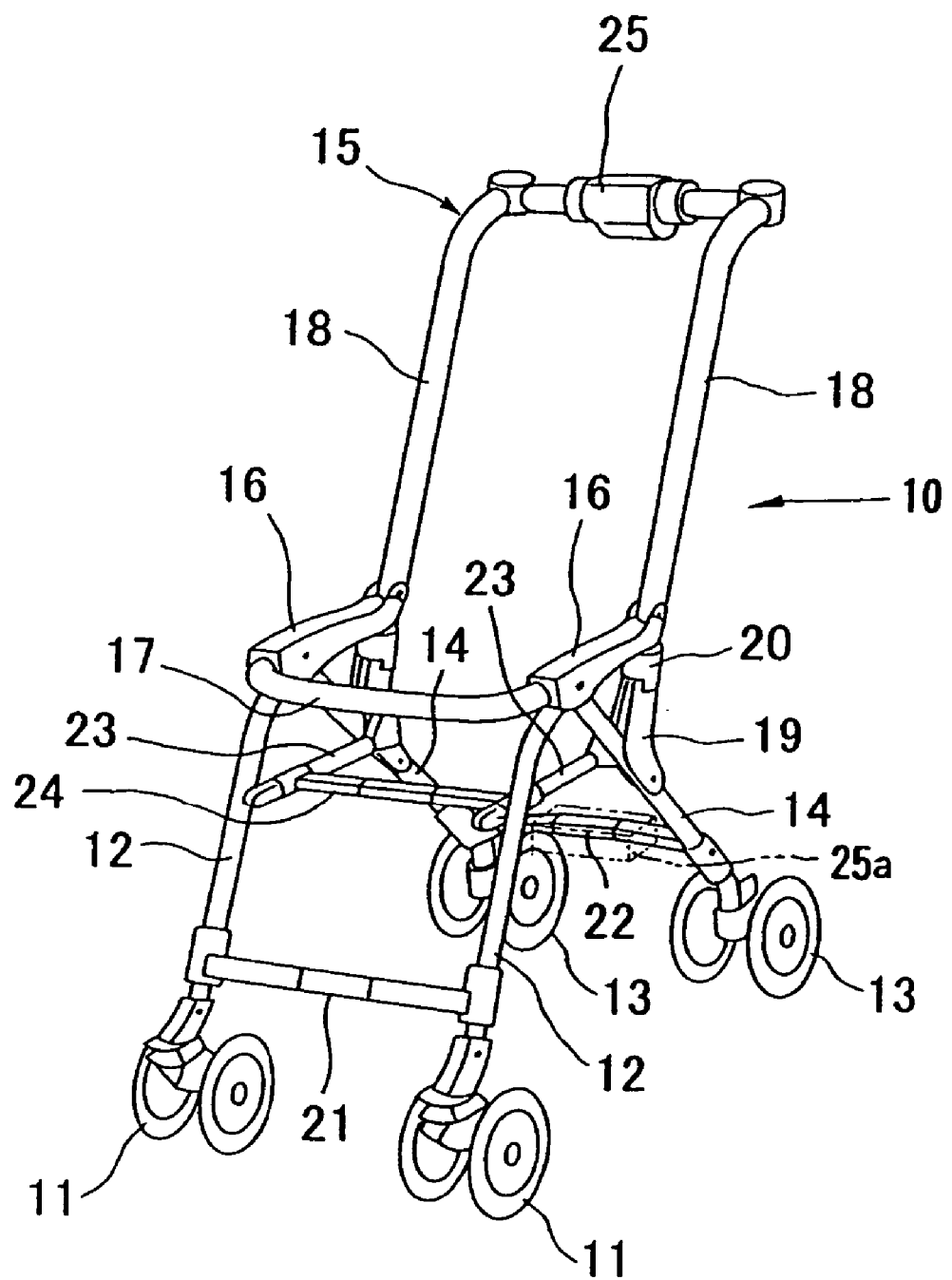
FIG. 19 is a perspective view of a stroller according to the present invention.
Figure 20:
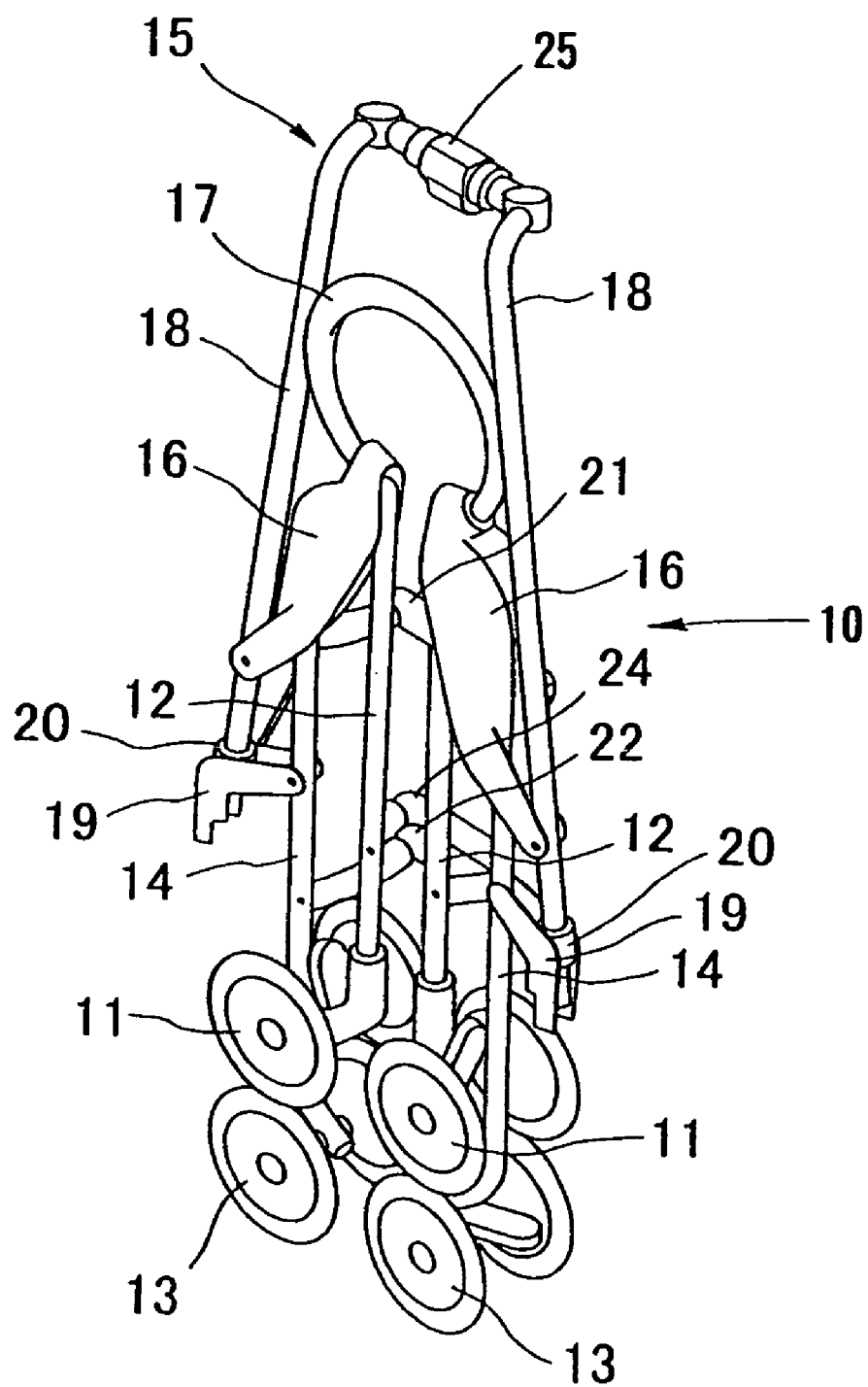
FIG. 20 is a perspective view of the stroller shown in FIG. 19 folded in three.

A first embodiment according to the present invention is shown in FIGS. 1, 19 and 20. General construction of a folding stroller 10 in the first embodiment will be described with reference to FIGS. 19 and 20 showing the stroller 10 in perspective views.

Referring to FIG. 19, the stroller 10 has two front legs (right and left front legs) 12 provided with front wheels 11, two rear legs (right and left rear legs) 14 provided with rear wheels 13, a substantially U-shaped handle 15, two armrests (right and left armrests) 16, and a detachable guard arm 17 extended between the armrests 16. The handle 15 has right and left side pipes 18. Rear ends of the armrests 16 are pivotally connected to parts near lower ends of the right and the left side pipes 18, respectively. Upper end parts of the front legs 12 are pivotally joined to front end parts of the armrests 16, respectively. Upper end parts of the rear legs 14 are pivotally joined to middle parts of the armrests 16, respectively. Lower ends of L-shaped brackets 19 are pivotally joined to middle parts of the rear legs 14, respectively. Lower ends of the side pipes 18 of the handle are pivotally joined to middle parts of the brackets 19, respectively. When the stroller 10 is unfolded, locking members 20 slidably mounted on lower end parts of the side pipes 18 engage with locking parts formed in upper ends of the brackets 19, respectively, to hold the stroller 10 in an unfolded state.

The right and the left front leg 12 are connected by a front connecting bar 21, and the right and the left rear legs 14 are connected by a rear connecting bar 22. Front ends of side connecting bars 23 are pivotally joined to middle parts of the front legs 12, respectively, and rear ends of the side connecting bars 23 are pivotally joined together with the brackets 19 to lower end parts of the side pipes 18, respectively. Middle parts of the side connecting bars 23 are connected by an upper connecting bar 24.

As shown in FIG. 19, the locking members 20 on the lower ends of the side pipes 18 are engaged with upper locking parts of the brackets 19 to hold the stroller 10 in an unfolded state for use. When a folding part operating mechanism 25, combined with the handle 15, is operated to disengage the locking members 20 from the brackets 19, the armrests 16 and the side connecting bars 23 are allowed to turn upwardly about pivotal joints on the side pipes 18, so that the front legs 12 and the rear legs 14 can be folded so as to extend substantially parallel to each other to facilitate carrying the stroller 10.

The handle 15, the front connecting bar 21, the rear connecting bar 22 and the upper connecting bar 24 have middle parts each provided with two joints at its opposite ends, and the joints at the opposite ends of the middle parts are included in two vertical planes, respectively. Thus, the handle 15, the front connecting bar 21, the rear connecting bar 22 and the upper connecting bar 24 are foldable. When the side pipes 18 are moved forward after folding the front legs 12 and the rear legs 14 so as to extend substantially parallel, respective end parts of the handle 15, the front connecting bar 21, the rear connecting bar 22 and the upper connecting bar 24 are bent forwardly. Consequently, the stroller 10 can be compactly folded in three as shown in FIG. 20.

The folding part operating mechanism 25 will be described with reference to FIG. 1. The handle 15 of the stroller 10 has the two side pipes 18, and a horizontal middle part 30 extended between the two side pipes 18. The side pipes 18 are joined to opposite ends of the horizontal middle part 30 so as to be turnable about axes perpendicular to an axis of the horizontal middle part 30.

As shown in FIG. 1, first bevel gears 31 are mounted on the opposite end parts of the horizontal middle part 30 of the handle 15, respectively. The first bevel gears 31 are housed in joint casings 32. Opposite end parts of the horizontal middle part 30 are supported for turning about an axis by the joint casings 32. Shafts 33 are housed in and supported on the joint casings 32 for turning about axes perpendicular to the axis of the horizontal middle part 30. Second bevel gears 34 are fixedly mounted on the shafts 33 so as to engage with the first bevel gears 31, respectively.

Pipe connectors 35 are connected to middle parts of the shafts 33 so as to project perpendicularly to the axes of the shafts 33, respectively. The pipe connectors 35 extend outside through openings 36 formed in the joint casings 32, respectively, and horizontal upper end parts formed in a shape resembling an inverted letter L of the side pipes 18 are fixed to the pipe connectors 35, respectively. The openings 36 of the joint casings 32 extend circumferentially in an angular range of about 90°. The pipe connectors 35 connected to the horizontal upper end parts of the side pipes 18 can be set in an unfolded state with their axes aligned with the axis of the horizontal middle part 30, or a folded state with their axes extended perpendicularly to the axis of the horizontal middle part 30. A housing 37 included in the folding part operating mechanism 25 is fastened to the horizontal middle part 30 via a fastening pin 38.

When an end part of the housing 37 is raised, the horizontal middle part 30 turns in the direction of an arrow indicated in FIG. 1. Consequently, the first bevel gears 31 drive the second bevel gears 34 for turning in directions of respective arrows and the horizontal upper end parts of the right and the left side pipes 18 are turned from positions corresponding to the folded state, where the horizontal upper end parts of the right and the left side pipes 18 are perpendicular to the horizontal middle part 30 as shown in FIG. 1, to positions corresponding to the unfolded sate, where the horizontal upper end parts of the right and the left side pipes 18 are aligned with the horizontal middle part 30, respectively. Conversely, when the end part of the housing 37 is depressed, the horizontal upper end parts of the right and the left side pipes 18 are turned in opposite directions through the first bevel gears 31 and the second bevel gears 34 from positions corresponding to the unfolded state to positions corresponding to the folded state, respectively.

In FIG. 1, the first bevel gears 31 and the second bevel gears 34 form gear trains. The gear trains and the housing 37 constitute the folding part operating mechanism 25.

A release mechanism 39a is formed in the housing 37. The release mechanism 39a disengages the locking members 20 slidably mounted on the lower end parts of the side pipes 18 from the brackets 19, respectively. Two sliders (right and left sliders) 39 are placed in the horizontal middle part 30 and are connected by wires 40 to the locking members 20 mounted on the right and the left side pipes 18, respectively. The horizontal middle part 30 is provided with two slots (right and left slots) 41 extending along the axis of the horizontal middle part 30. Projections 42 projecting from the sliders 39 are engaged in the slots 41, respectively, as shown in FIG. 2 to guide the sliders 39 for axial movement in the horizontal middle part 30.

Figure 2:
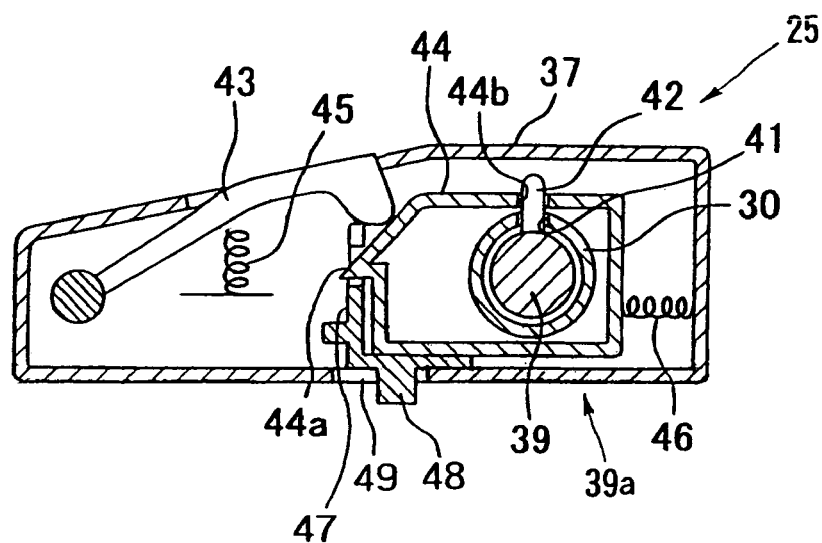
FIG. 2 is a cross-sectional view of a folding mechanism shown in FIG. 1.

Referring to FIG. 2, a release lever 43 is supported pivotally in the housing 37. A cam member 44 is placed in the housing 37 so as to be moved in directions perpendicular to the axis of the horizontal middle part 30 by turning the release lever 43. The release lever 43 is pushed upwardly by a spring 45. The cam member 44 has an inclined wall 44a rising toward the horizontal middle part 30, and a top wall overlying the horizontal middle part 30 and provided with two oblique slots 44b inclined relative to the axis of the horizontal middle part 30. The projections 42 projecting from the sliders 39 are engaged in the oblique slots 44b, respectively. The cam member 44 is pushed toward the release lever 43 by a spring 46.

A safety lever 47 having an L-shaped cross section is placed in the housing 37 on a side of the inclined wall 44a of the cam member 44, i.e., a side opposite of the horizontal middle part 30 with respect to the cam member 44, so as to be movable in directions perpendicular to the axis of the horizontal middle part 30. The safety lever 47 is pushed toward the cam member 44 by a spring, not shown, such that a top of the safety lever 47 is in contact with the release lever 43 to prevent the release lever 43 from being depressed. An operating button 48 projecting from a lower surface of the safety lever 47 projects outside from the housing 37 through an opening 49 formed in the housing 37.

When the release lever 43 is depressed against resilience of the spring 45 after moving the safety lever 47 to the left, as viewed in FIG. 2, by operating the operating button 48 to disengage the safety lever 47 from the release lever 43, a free end of the release lever 43 engages with and exerts force on the inclined wall 44a of the cam member 44. Consequently, the cam member 44 is forced to move in a direction perpendicular to the axis of the horizontal middle part 30. Then, the projections 42 projecting from the sliders 39 are forced to move toward each other via the two oblique slots 44b. Consequently, the locking members 20 are pulled by the wires 40 and disengaged from the brackets 19 to enable the stroller 10 to be folded.

When a free end of the housing 37 is depressed, after the locking members 20 have been thus disengaged from the brackets 19 by operating the release lever 43, and the front legs 12 and the rear legs 14 have been folded so as to extend parallel to each other, the pipe connectors 35 and the side pipes 18 are shifted from their positions corresponding to the unfolded state to their positions corresponding to the folded state via the first bevel gears 31 and the second bevel gears 34. When the housing 37 is raised with the pipe connectors 35 and the side pipes 18 set in the folded state, the horizontal upper end parts of the right and the left side pipe 18 are aligned with the horizontal middle part 30 and the stroller 10 is unfolded for use.

Thus, a user is able to fold and unfold the stroller 10 simply by turning nearby housing 37 without ever letting go of the housing 37.

Figure 3:
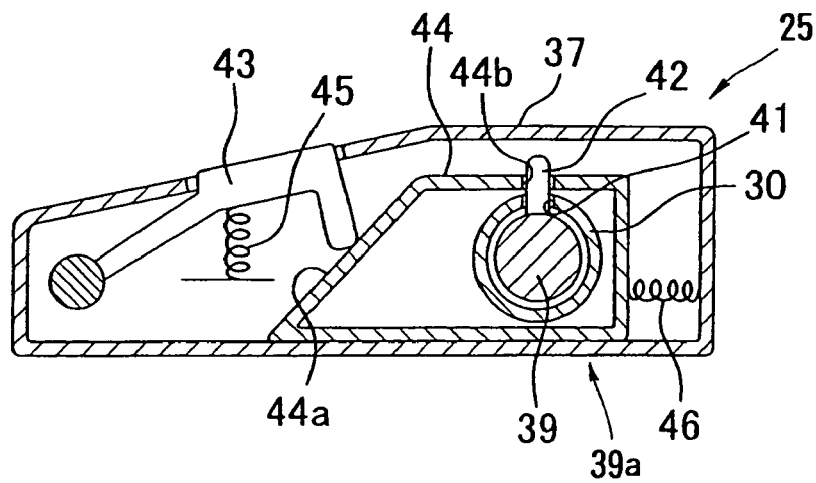
FIG. 3 is a cross-sectional view of a modification of the folding mechanism shown in FIG. 2.

The safety lever 47 may be omitted as shown in FIG. 3.

Figure 4:
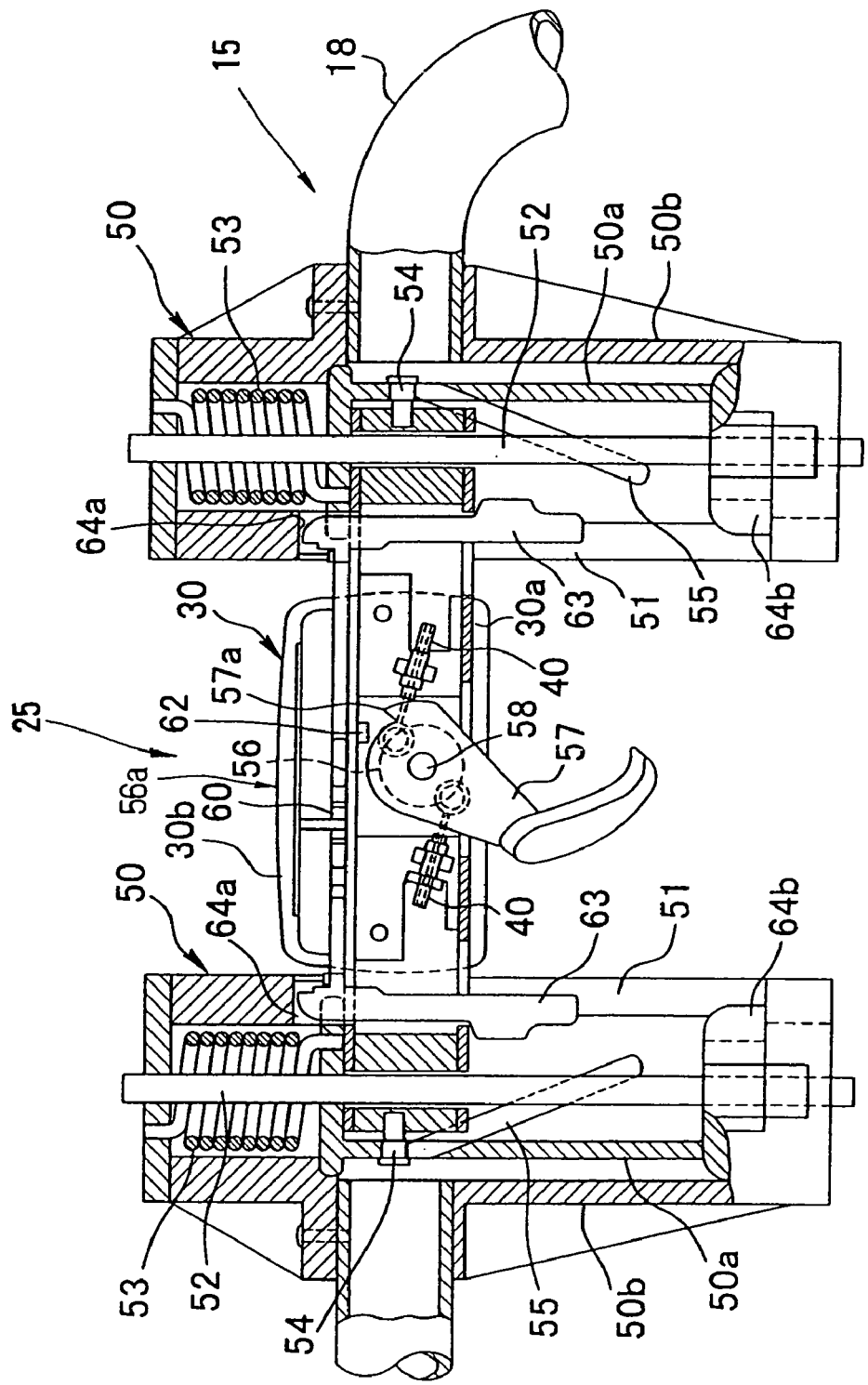
FIG. 4 is a sectional view of a stroller of a second embodiment according to the present invention in an unfolded state.
Figure 5:
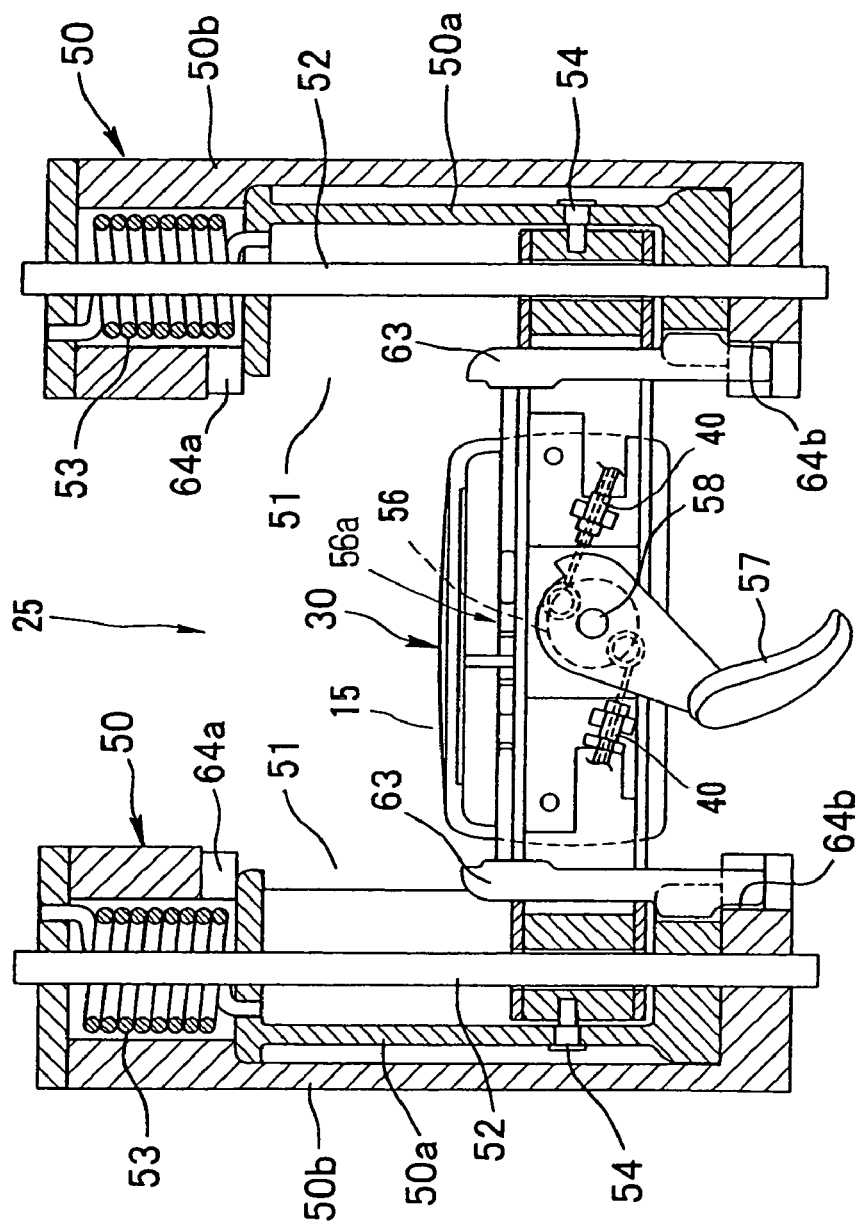
FIG. 5 is a sectional view of the stroller of the second embodiment in a folded state.

A stroller 10 of a second embodiment according to the present invention will be described. Referring to FIGS. 4 and 5 showing the second embodiment of the present invention, vertical tubular structures 50 are fastened to horizontal upper end parts of right and left side pipes 18 included in a handle 15. Openings 51 are formed in opposite parts of the tubular structures 50, respectively, and opposite end parts of a horizontal middle part 30 included in the handle 15 are inserted through the openings 51 in the tubular structures 50, respectively, to connect the right and the left tubular structures 50. A vertical guide rod 52 is extended in each of the tubular structures 50, and an end part of the horizontal middle part 30 is placed closely on the guide rod 52. The horizontal middle part 30 is able to move vertically along the guide rods 52. The opening 51 of each tubular structure 50 is formed such that the horizontal middle part 30 is able to move vertically, and each tubular structure 50 is able to turn on a corresponding guide rod 52 relative to the horizontal middle part 30 in an angular range of about 90°.

Each tubular structure 50 consists of an outer tube 50b and an inner tube 50a, coaxially inserted in the outer tube 50b and provided with a helical groove 55. The inner tube 50a and the outer tube 50b are interlocked by a coil spring 53 that is coaxial with the inner tube 50a and the outer tube 50b. The inner tube 50a turns the outer tube 50b via the coil spring 53. The horizontal middle part 30 is inserted through the outer tube 50b and into the inner tube 50a. A projection 54 projecting parallel to the axis of the horizontal middle part 30 from each end of the horizontal middle part 30 is engaged in a corresponding helical groove 55 of a corresponding inner tube 50a.

The tubular structures 50 each including the inner tube 50a and the outer tube 50b, and the horizontal middle part 30 constitute a folding part operating mechanism 25.

When the horizontal middle part 30 is moved vertically, the inner tubes 50a and the outer tubes 50b are turned on the guide rods 52 by agency of the helical grooves 55 of the inner tubes 50a and the projections 54 engaged in the helical grooves 55, respectively. In this manner, the inner tubes 50a and the outer tubes 50b are set in an unfolded state, where the horizontal upper end parts of the right and the left side pipe 18 are aligned with the horizontal middle part 30 as shown in FIG. 4, or in a folded state, where the horizontal upper end parts of the right and the left side pipes 18 extend perpendicularly to the horizontal middle part 30 as shown in FIG. 5.

The horizontal middle part 30 is provided with a release mechanism 56a. The release mechanism 56a disengages locking members 20 slidably mounted on the lower end parts of the side pipes 18 (FIG. 19) from brackets 19 pivotally joined to the side pipes 18, respectively. The release mechanism 56a is for maintaining the stroller in an unfolded state or in a folded state. The horizontal middle part 30 includes a frame 30a of a metal having a U-shaped cross section, and cases 30b covering opposite sides of the frame 30a. A pulley 56 is disposed in the horizontal middle part 30. Wires 40 are connected to the pulley 56. Each of the wires 40 has one end connected to the pulley 56 and another end connected to a corresponding locking member 20 slidably mounted on a corresponding side pipe 18. The pulley 56 is a component of the release mechanism 56a.

An operating lever 57 is formed integrally with the pulley 56. The pulley 56 and the operating lever 57 are supported on a shaft 58 extending perpendicularly to the axis of the horizontal middle part 30. The operating lever 57 projects downwardly from the cases 30b. When the operating lever 57 is turned on the shaft 58 to turn the pulley 56, the wires 40 pull the locking members 20 to disengage the locking members 20 from the brackets 19.

Referring to FIGS. 6A and 6B, a pinion 60 is supported for turning on a substantially central part of an upper wall of the frame 30a. Two racks 61a and 61b are disposed on opposite sides of the pinion 60, are engaged with the pinion 60, and are supported for lateral sliding on the frame 30a. A U-shaped frame 62 protrudes from the rack 61a toward the pulley 56 as indicated by broken lines in FIGS. 6A and 6B so as to engage with a tip 57a of the operating lever 57.

When the operating lever 57 is operated, the tip 57a of the operating lever 57 is engaged with the frame 62, the rack 61a is moved away from the right-hand tubular structure 50, as viewed in FIGS. 6A and 6B, and the other rack 61b is moved away from the left-hand tubular structure 50, as viewed in FIGS. 6A and 6B.

As shown in FIGS. 4 and 5, locking bars 63 extend vertically from outer ends of the racks 61a and 61b, respectively. The locking bars 63 are able to engage selectively in recesses formed in the tubular structures 50, respectively.

An upper recess 64a and a lower recess 64b are formed in an upper end and a lower end, respectively, of the opening 51 formed in the inner tube 50a and the outer tube 50b of each tubular structure 50. Locking bar 63 engages in the upper recess 64a when the handle 15 is in an unfolded state, or engages in the lower recess 64b when the handle 15 is in a folded state. The upper recess 64a and the lower recess 64b are spaced an angular distance of about 90° apart from each other.

When the stroller 10 is unfolded for use, the locking bars engage in the upper recesses 64a as shown in FIGS. 4 and 6A to hold the handle 15 in the unfolded state.

When the operating lever 57 is turned counterclockwise, as viewed in FIG. 4, the racks 61a and 61b are moved inwardly and the locking bars 63 are disengaged from the upper recesses 64a. When the horizontal middle part 30 is depressed in this state, the inner tubes 50a are turned on the guide rods 52 by agency of the helical grooves 55 formed in the inner tubes 50a and the projections 54 engaged in the helical grooves 55. When the horizontal middle part 30 is raised slightly in this state to reduce a force exerted on the handle 15, the outer tubes 50b are turned by energy stored in the coil springs 53 by turning the inner tubes 50a. Consequently, the horizontal upper end parts of the side pipes 18 of the handle 15 are turned so as to extend perpendicularly to the axis of the horizontal middle part 30 in the folded state as shown in FIG. 6B, and the locking bars 63 are engaged in the lower recesses 64b to hold the handle 15 in the folded state.

To unfold folded handle 15, the operating lever 57 is operated to disengage the locking bars 63 from the lower recesses 64b, and the horizontal middle part 30 is raised. Then, the inner tubes 50a are turned in an opposite direction by agency of the helical grooves 55 and the projections 54 engaged in the helical grooves 55. As the horizontal middle part 30 is raised further, the outer tubes 50b are turned in the same direction as the inner tube 50a via the coil springs 53, the handle 15 is unfolded, and the locking bars 63 are engaged in the upper recesses 64a to hold the handle 15 in the unfolded state.

Since the stroller 10 can be folded or unfolded simply by vertically moving nearby horizontal middle part 30, a user is able to fold or unfold the stroller 10 while continuously grabbing the horizontal middle part 30.

Figure 7:
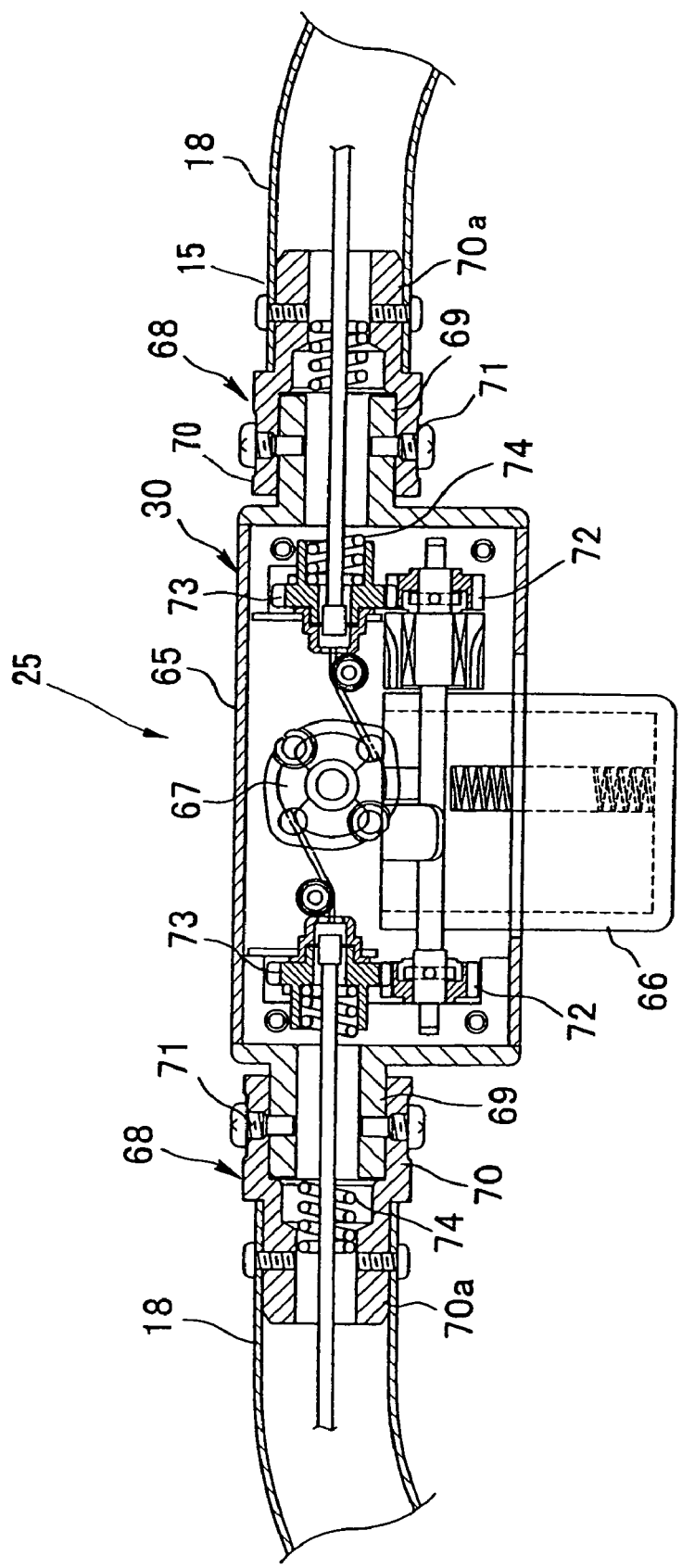
FIG. 7 is a sectional view of a third embodiment according to the present invention.
Figure 8:
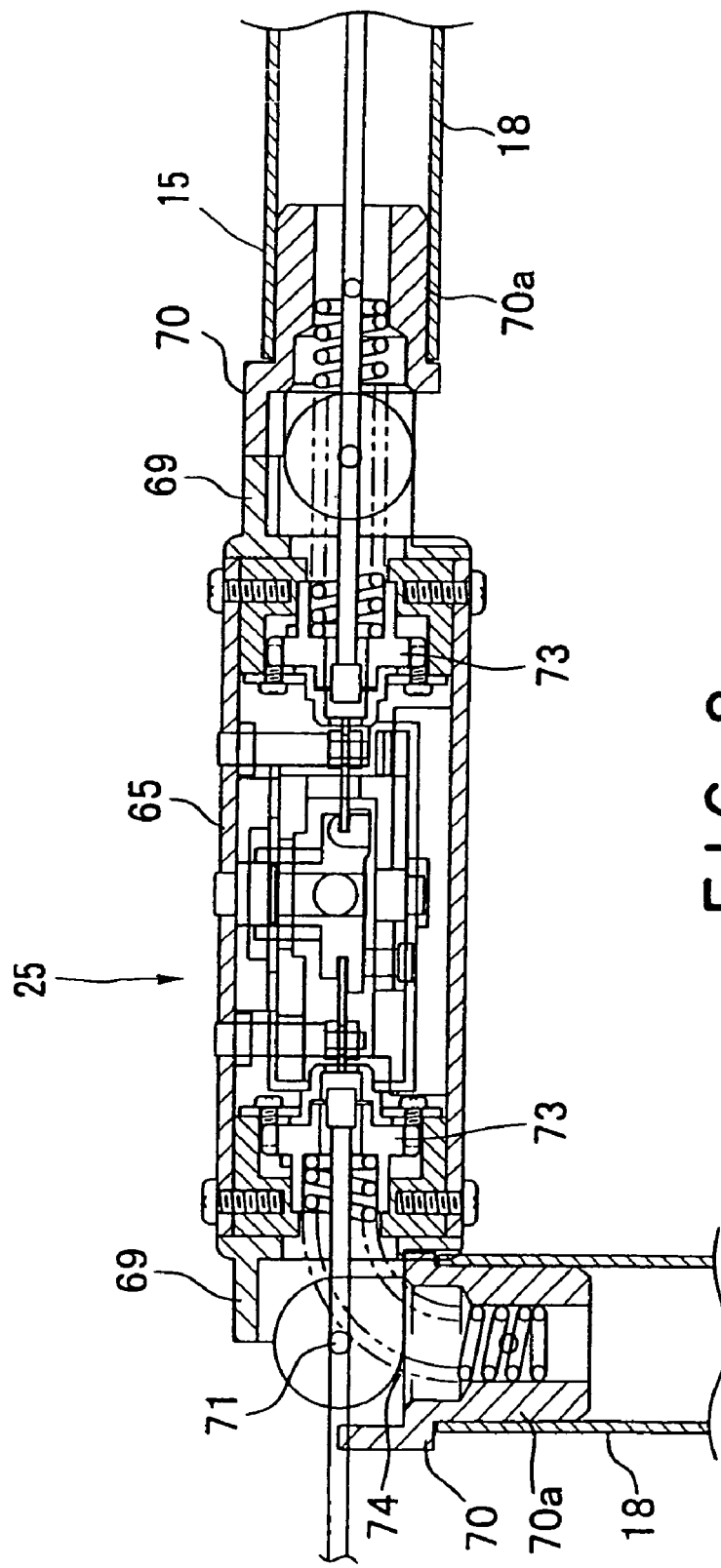
FIG. 8 is a sectional view of assistance in explaining operation of the third embodiment shown in FIG. 7.

A stroller 10 of a third embodiment according to the present invention will be described. Referring to FIGS. 7 and 8 showing the third embodiment of the present invention, a housing 65 included in a folding part operating mechanism 25 is mounted on a horizontal middle part 30. A pulley 67 is supported for turning in the housing 65. The pulley 67 is turned by an operating lever 66. When the operating lever 66 is operated to turn the pulley 67, locking members 20 included in the stroller 10 are disengaged from associated parts.

Side pipes 18 included in a handle 15 are connected to opposite ends of the housing 65 by joints 68, respectively. Each of the joints 68 has a first joint member 69 attached to one end of the housing 65 and having a projection, and a second joint member 70 connected to the side pipe 18 and having two corresponding projections. The projection of the first joint member 69 is fitted into a space between the two corresponding projections of the second joint member 70, and is pivotally joined to the two corresponding projections of the second joint member 70 for turning about an axis 71 perpendicular to an axis of the horizontal middle part 30 of the handle 15.

Two drive gears 72 are disposed in the housing 65 so as to be turned by the operating lever 66, and driven gears 73 are engaged with the drive gears 72, respectively. A shape memory spring 74 has one end fixed to a central part of each driven gear 73 and another end fixedly fitted in a bore formed in a respective second joint member 70.

When the operating lever 66 is operated to turn the drive gears 72 with the handle 15 set in an unfolded state as shown in FIG. 7, the driven gears 73 are turned and the shape memory springs 74 are twisted. Consequently, the shape memory springs 74 bend in an original shape corresponding to a twist, i.e., a shape resembling a right-angled bend, such that the second joint members 70 are extended in a direction perpendicular to the axis of the horizontal middle part 30 as shown in a left part of FIG. 8. Thus the right and the left side pipes 18 are held in a folded state. When the shape memory springs 74 are untwisted, the shape memory springs 74 straighten to bring the handle 5 into the unfolded state.

Figure 9:
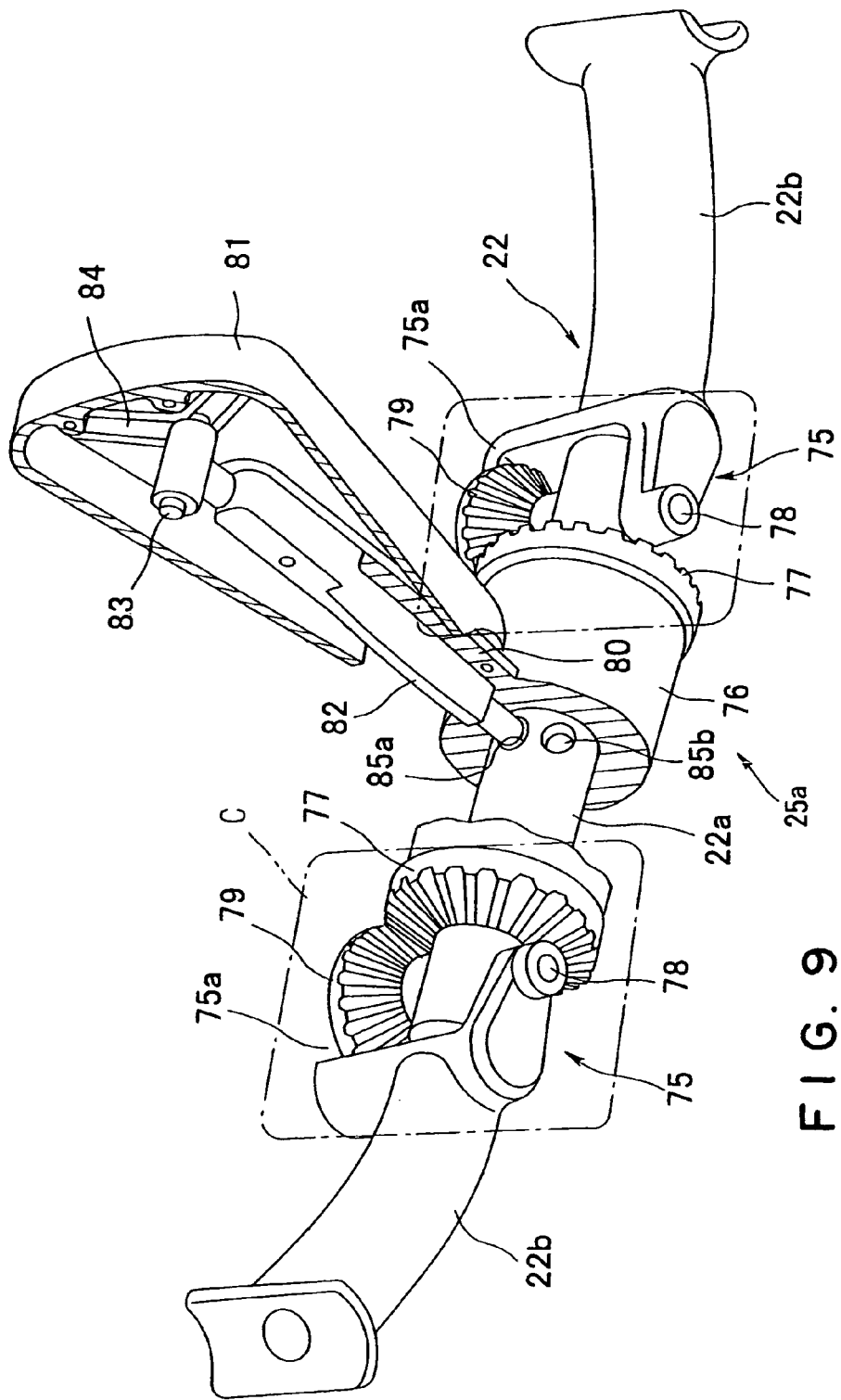
FIG. 9 is a partly sectional perspective view of a fourth embodiment according to the present invention.

A stroller 10 of a fourth embodiment according to the present invention will be described. Referring to FIG. 9, a folding part operating mechanism 25a is combined with a rear connecting bar 22 (FIG. 19) connecting right and left rear legs 14 included in the stroller 10. The connecting bar 22 has a right end section 22b, a left end section 22b and a middle section 22a. The right and the left end sections 22b are connected to opposite ends of the middle section 22a by joints 75, respectively.

A tubular member 76 is placed on the middle section 22a. First bevel gears 77 are fixed to opposite ends of the tubular member 76, respectively. A second bevel gear 79 is supported on a joint pin 78 included in each of the joints 75, is engaged with a corresponding first bevel gear 77, and is fixed to an outer joint member 75a included in the joint 75 and connected to a corresponding end section 22b.

An operating lever holding member 80 projects obliquely upwardly toward a rear of the stroller 10 from the tubular member 76. A hollow operating lever 81 is pivoted on the operating lever holding member 80 so as to be turnable in a predetermined angular range. A locking bolt 82 is supported slidably in the operating lever 81 and is pushed toward the middle section 22a by a spring, not shown. A guide pin 83 is attached laterally to an outer end of the bolt 82. Opposite ends of the guide pin 83 are engaged in V-shaped guide grooves 84 diverging in a direction away from the middle section 22a, i.e., toward a tip of the lever 81, and formed on opposite inner surfaces of the operating lever 81, respectively. The middle section 22a is provided with holes 85a and 85b. An inner end of the bolt 82 can be engaged in the hole 85a when the rear connecting bar 22 is unfolded, and can be engaged in the hole 85b when the rear connecting bar 22 is folded. The joints 75 are covered with covers c indicated by chain lines in FIG. 9.

As shown in FIG. 9, the tubular member 76 fixedly provided with the first bevel gears 77, and the second bevel gears 79 constitute the folding part operating mechanism 25a.

The inner end of the bolt 82 is engaged in the hole 85a of the middle section 22a as shown in FIG. 9 when the rear connecting bar 22 is unfolded to hold the rear connecting bar 22 in an unfolded state. When the stroller 10 needs to be folded, the operating lever 81 is operated, for example, by foot to turn the same on the operating lever holding member 80. Then, the guide pin 83 is moved along the guide grooves 84 to pull the bolt 82 out of the hole 85a. Then, the operating lever 81 is depressed, for example, by foot to turn the tubular member 76 on the middle section 22a. Consequently, the first bevel gears 77 turn the second bevel gears 79 on the joint pins 78, whereby the end sections 22b are turned forwardly and are set in a folded state. When the stroller 10 needs to be unfolded, the operating lever 81 is turned in an opposite direction to unfold the end sections 22b via the first bevel gears 77 and the second bevel gears 79.

Figure 10:
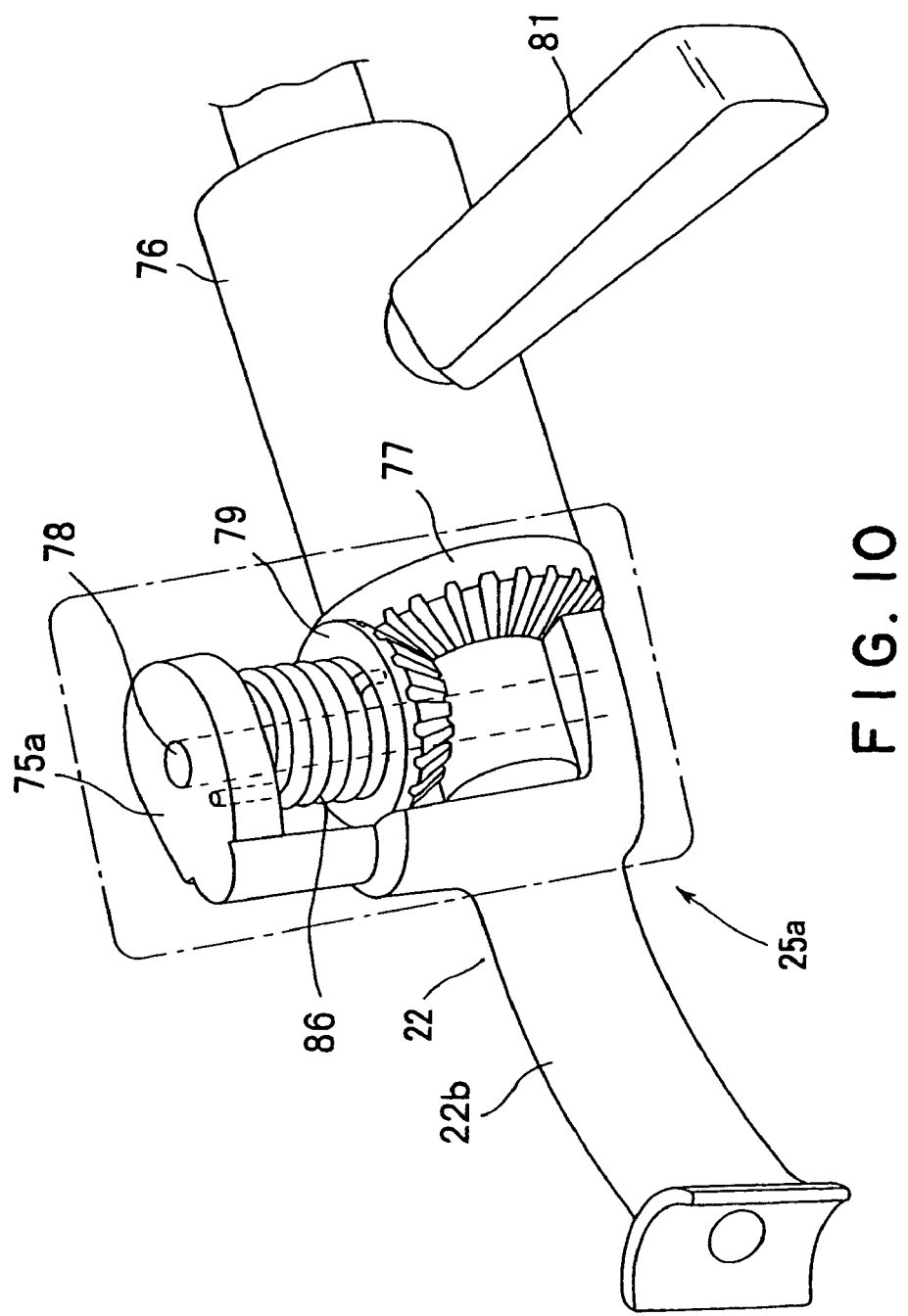
FIG. 10 is a modification of the fourth embodiment shown in FIG. 9.

FIG. 10 shows a modification of the folding part operating mechanism 25a shown in FIG. 9. In this modification, a coil spring 86 is wound around each second bevel gear 79. The coil spring 86 has one end connected to the second bevel gear 79 and another end connected to a corresponding outer joint member 75a.

When tubular member 76 is turned by operating operating lever 81, the first bevel gears 77 turn the corresponding second bevel gears 79, whereby the coil springs 86 are twisted to store resilience. Then, rear wheels are lifted up slightly in this state to reduce load on the rear wheels. Consequently, the outer joint members 75a are turned by stored resilience of the coil springs 86 to turn the end sections 22b of the rear connecting bar 22 forwardly, and the rear connecting bar 22 is folded.

A stroller 10 of a fifth embodiment according to the present invention will be described with reference to FIG. 11. A rear connecting bar 22 has a middle section 22a, and end sections 22b connected to opposite ends of the middle section 22a by joints 75, respectively. The end sections 22b can be turned on the joints 75 to fold the rear connecting bar 22. A tubular member 76 is mounted on the middle section 22a, and first bevel gears 77 are connected fixedly to opposite ends of the middle section 22a, respectively. Second bevel gears 79 are supported on joint pins 78 and are engaged with the first bevel gears 77, respectively. Plates 87 are attached fixedly to the second bevel gears 79. End parts of the plates 87 are connected to the end sections 22b by connecting rods 88, respectively. As shown in FIG. 12, springs 89 are extended between parts, spaced from the joint pins 78 of the plates 87. Therefore, the plates 87 and the end sections 22b are urged forwardly by the springs 89. An operating lever 90 is fastened to the tubular member 76.

Figure 11:
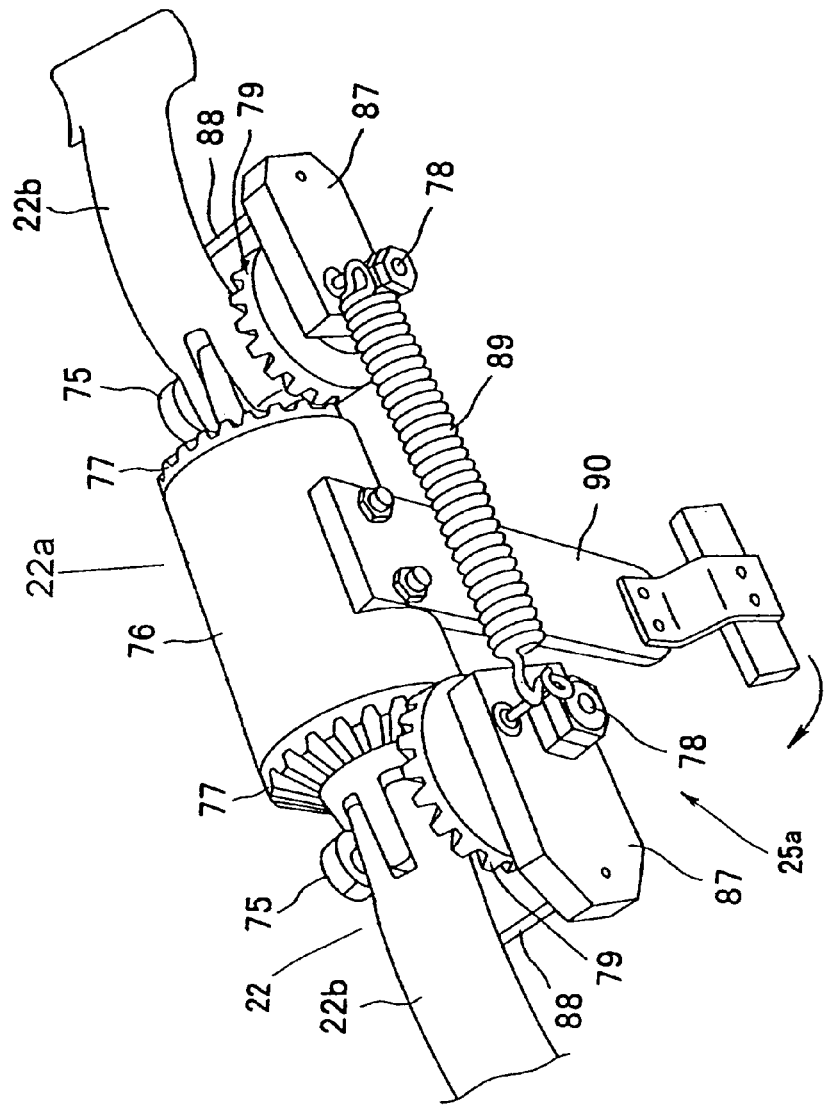
FIG. 11 is a perspective view of a fifth embodiment according to the present invention.

When an unfolded rear connecting bar 22 shown in FIG. 11 needs to be folded, the operating lever 90 is raised in the direction of the arrow to turn the end sections 22b forwardly via the first bevel gears 77, the second bevel gears 79 and the plates 87 to positions indicated by two-dot chain lines in FIG. 12, respectively. Since the end sections 22b are urged forwardly by the springs 89, the end sections 22b can be turned forwardly by applying a small force to the operating lever 90, and the rear connecting bar 22 can be relatively easily folded.

When the rear connecting bar 22 needs to be unfolded, the operating lever 90 is depressed to turn the end sections 22b rearwardly via the first bevel gears 77, the second bevel gears 79 and the plates 87 to set the connecting bar in an unfolded state.

Although the end sections 22b of the rear connecting bar 22 of the fifth embodiment are urged in a folding direction by the springs 89, end sections 21b of a front connecting bar 21, similarly to the end sections 22b of the rear connecting bar 22, may be urged in a folding direction by extending a spring 91 between the end sections 21b to facilitate folding the stroller 10.

Figure 15:
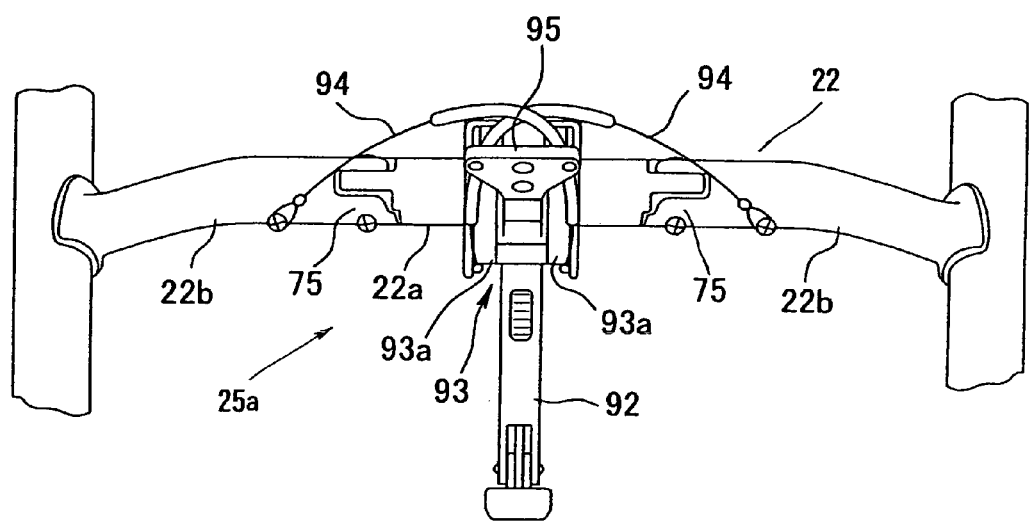
FIG. 15 is a plan view of the sixth embodiment shown in FIG. 14.

A stroller 10 of a sixth embodiment according to the present invention will be described with reference to FIGS. 14 and 15. A folding rear connecting bar 22 connecting right and left rear legs 14 has a middle section 22a, and end sections 22b connected to opposite ends of the middle section 22a by joints 75, respectively. A pulley 93 having two disks 93a, i.e., right and left disks 93a, is connected to a base part of an operating lever 92 and mounted for turning on the middle section 22a of the rear connecting bar 22. Two wires 94 are wound in the same direction around the pulley 93, and free ends of the wires 94 are fixed to the pulley 93. A guide member 95 projects forwardly from the middle section 22a through a space between the two disks 93a. The guide member 95 guides the wires 94 having ends fixed to the pulley 93 so as to cross each other. Other ends of the wires 94 are connected to middle parts of the end sections 22b, respectively.

The operating lever 92 connected to the pulley 93 is hollow. A bolt 97 is extended axially slidably in the operating lever 92 and is pushed toward the middle section 22a by a spring 96. A plate 99 provided with a knob 98 is pivoted on an outer free end part of the operating lever 92. The plate 99 is connected to an outer end of the bolt 97 by a link 100. The middle section 22a is provided with a hole 85a in which a front end of the bolt 97 is engaged when the rear connecting bar 22 is unfolded, and a hole 85b in which the front end of the bolt 97 is engaged when the rear connecting bar 22 is folded.

When the rear connecting bar 22 is unfolded as shown in FIG. 14, the inner end of the bolt 97 is engaged in the hole 85a to hold the rear connecting bar 22 in an unfolded state. When the stroller 10 needs to be folded, the knob 98 is turned relative to the operating lever 92. Then, the bolt 97 is pulled by the plate 99 and the link 100 to disengage the bolt 97 from the hole 85a. Then the operating lever 92 is depressed to turn the pulley 93 on the middle section 22a. Consequently, the end sections 22b are pulled and turned forwardly by the wires 94 connected to the pulley 93 to set the rear connecting bar in a folded state.

A stroller 10 of a seventh embodiment according to the present invention will be described with reference to FIG. 16. A folding rear connecting bar 22 has a middle section 22a, and end sections 22b connected to opposite ends of the middle section 22a by joints 75, respectively. A tubular member 102 provided with an operating lever 101 is mounted for turning on the middle section 22a. Two inclined slots 103 diverging from each other are formed in a front part of the tubular member 102. Projections 105 projecting from inner end parts of connecting rods 104 capable of axially sliding on the middle section 22a toward and away from each other are engaged in the inclined slots 103, respectively. Outer ends of the connecting rods 104 are connected to rods 106 connected to parts of outer joint members 75a of the joints 75 at a distance from turning axes of the outer joint members 75a, respectively.

When the operating lever 101 is raised to turn the tubular member 102 in an unfolded state shown in FIG. 16, the inclined slots 103 force the projections 105 to move toward each other, whereby the connecting rods 104 are moved toward each other, and the outer joint members 75a of the joints 75 are turned on joint pins 78 by the rods 106 to turn the end sections 22b forward for folding. These steps are reversed to unfold the rear connecting bar 22.

Figure 17:
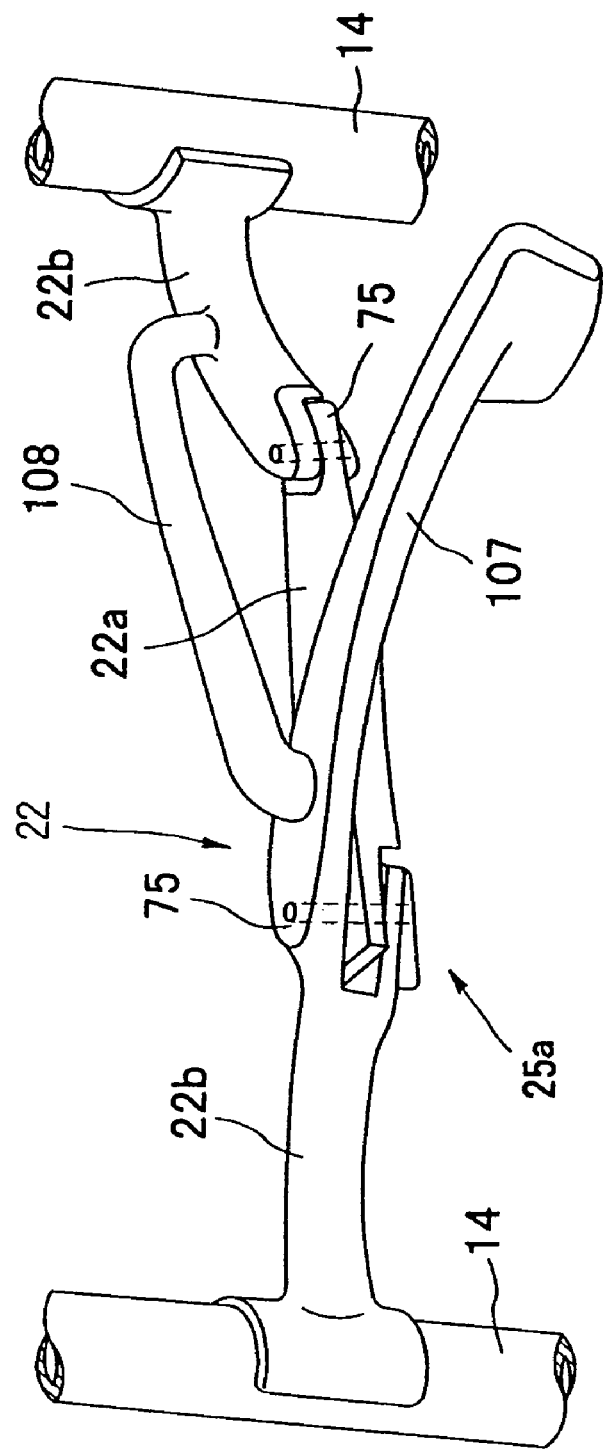
FIG. 17 is a perspective view of an eighth embodiment according to the present invention.

A stroller 10 of an eighth embodiment according to the present invention will be described with reference to FIG. 17. A folding rear connecting bar 22 has a middle section 22a, and end sections 22b connected to opposite ends of the middle section 22a by joints 75, respectively. An operating rod 107 is formed integrally with one of the end sections 22b so as to extend from an inner end of this end section 22b. A middle part of the operating rod 107 and a middle part of the other end section 22b are connected by a link 108.

Figure 18A:
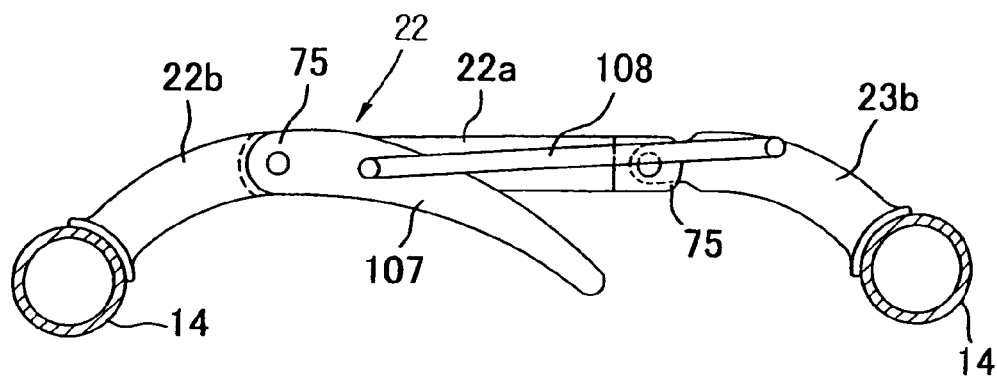
FIGS. 18A and 18B are views of assistance in explaining operation of the eighth embodiment shown in FIG. 17.
Figure 18B:
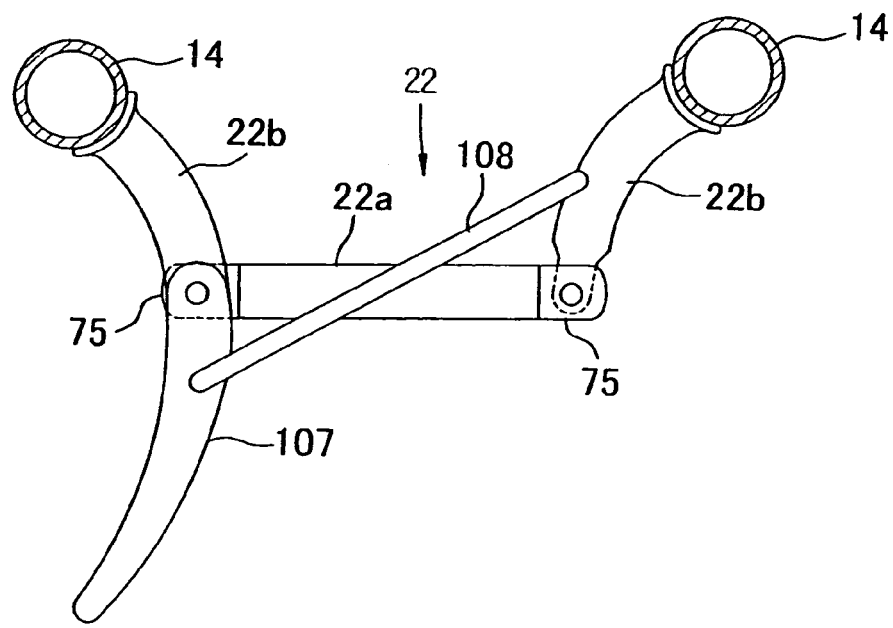

FIG. 18A is a plan view of the rear connecting bar 22 in an unfolded state. When the rear connecting bar 22 in the unfolded state as shown in FIG. 18A needs to be folded, the operating rod 107 is pulled rearwardly. Consequently, the end section 22b united with the operating rod 107 turns together with the operating rod 107 on a joint pin, and the other end section 22b is turned forwardly relative to the middle section 22a by the link 108, and the rear connecting bar 22 is folded as shown in FIG. 18B.

A folded rear connecting bar 22 can be unfolded as shown in FIG. 18A, by pushing the operating lever 107 forwardly.

As is apparent from the foregoing description, a stroller foldable in three of the present invention can be folded by a remote operation, and a user is able to fold the stroller while continuously grabbing a horizontal middle part of the stroller by performing a comparatively simple, continuous operation.

What is claimed is:

1. A foldable stroller comprising:
   a handle having
   (i) a middle part having projections and having a longitudinal axis, and
   (ii) two side pipes connected to opposite ends of said middle part so as to be turnable about axes perpendicular to said axis of said middle part, respectively; and
   a folding part operating mechanism, incorporated into said handle, for turning said two side pipes about said axes, respectively, said folding part operating mechanism having tubular structures which
   (i) are interposed between said side pipes and said middle part, respectively,
   (ii) extend along said axes about which said two side pipes are turnable, respectively, and
   (iii) have helical guide grooves in their inner surfaces, respectively;
   wherein said middle part is slidable relative to said tubular structures along said axes, and
   wherein said projections are engaged with said helical guide grooves, respectively, such that said projections slide along said helical guide grooves, respectively, when said middle part is slid relative to said tubular structures, so as to turn said side pipes together with said tubular structures about said axes.

2. The foldable stroller according to claim 1, wherein said tubular structures each comprise an inner tube and an outer tube, with said inner and outer tubes being coaxial, turnable relative to each other, and interconnected by a coil spring, openings for receiving said middle part are in each of said inner and outer tubes, and
   said helical guide grooves are in surfaces of said inner tubes, respectively.

3. The foldable stroller according to claim 1, further comprising:
   retractable bolts supported on opposite end parts of said middle part;
   first recesses in upper ends of openings formed in said tubular structures, respectively;
   and second recesses in lower ends of said openings formed in said tubular structures, respectively,
   wherein said retractable bolts engage said first recesses when the handle is unfolded so as to hold the handle in an unfolded state, and engage said second recesses when the handle is folded so as to hold the handle in a folded state.

4. The foldable stroller according to claim 3, further comprising:
   locking members for maintaining the stroller in the unfolded state; and
   a release mechanism, incorporated into said middle part, for releasing said locking members, said release mechanism including a release lever interlocked with said retractable bolts.

* * * * *